US012043987B2

(12) United States Patent
Kondo et al.

(10) Patent No.: US 12,043,987 B2
(45) Date of Patent: Jul. 23, 2024

(54) HYDRAULIC EXCAVATOR DRIVE SYSTEM

(71) Applicant: KAWASAKI JUKOGYO KABUSHIKI KAISHA, Kobe (JP)

(72) Inventors: Akihiro Kondo, Kobe (JP); Hideyasu Muraoka, Kobe (JP); Yoshiyuki Tode, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/923,632

(22) PCT Filed: May 26, 2021

(86) PCT No.: PCT/JP2021/019952

§ 371 (c)(1),
(2) Date: Nov. 7, 2022

(87) PCT Pub. No.: WO2021/251140

PCT Pub. Date: Dec. 16, 2021

(65) Prior Publication Data

US 2023/0183946 A1 Jun. 15, 2023

(30) Foreign Application Priority Data

Jun. 10, 2020 (JP) ................................ 2020-100636

(51) Int. Cl.
*E02F 9/22* (2006.01)
*F15B 11/02* (2006.01)

(52) U.S. Cl.
CPC .......... *E02F 9/2278* (2013.01); *E02F 9/2217* (2013.01); *F15B 11/02* (2013.01)

(58) Field of Classification Search
CPC ....... E02F 9/2217; E02F 3/435; E02F 9/2278; F15B 11/02
See application file for complete search history.

(56) References Cited

U.S. PATENT DOCUMENTS

| | | | | |
|---|---|---|---|---|
| 4,030,623 | A * | 6/1977 | Bridwell | F15B 11/17 414/694 |
| 2008/0034746 | A1 * | 2/2008 | Verkuilen | E02F 9/2292 60/422 |
| 2014/0090369 | A1 | 4/2014 | Nakamura et al. | |

FOREIGN PATENT DOCUMENTS

| | | | |
|---|---|---|---|
| JP | 2004-19806 | A | 1/2004 |
| JP | 2005-315312 | A | 11/2005 |
| JP | 2005315312 | A * | 11/2005 |
| JP | 2012-241803 | A | 12/2012 |

* cited by examiner

*Primary Examiner* — Abiy Teka
(74) *Attorney, Agent, or Firm* — Oliff PLC

(57) ABSTRACT

A hydraulic excavator drive system includes: a first pump connected to a head-side chamber of a boom cylinder; and a second pump that supplies hydraulic oil to one of, or both, an arm cylinder and a bucket cylinder. The first pump is driven by an electric motor. The drive system further includes a switching valve that is in a first position at a boom raising operation and in a second position at a vehicle body lifting operation. The first position is a position in which the switching valve brings a rod-side chamber of the boom cylinder into communication with a tank, and the second position is a position in which the switching valve brings the rod-side chamber into communication with the second pump.

5 Claims, 2 Drawing Sheets

HYDRAULIC EXCAVATOR DRIVE SYSTEM

CROSS-REFERENCE TO RELATED APPLICATIONS

This is a U.S. National Phase Application of PCT/JP2021/019952 filed on May 26, 2021, which designates the United States and claims priority to Japanese Patent Application No. 2020-100636 filed on Jun. 10, 2020, the entire contents of which are incorporated herein by reference.

TECHNICAL FIELD

The present disclosure relates to a hydraulic excavator drive system.

BACKGROUND ART

Generally speaking, in a hydraulic excavator, an arm is swingably coupled to the distal end of a boom that is luffed relative to a stewing structure, and a bucket is swingably coupled to the distal end of the arm. A drive system mounted in such a hydraulic excavator includes, for example, a boom cylinder that luffs the boom, an arm cylinder that swings the arm, and a bucket cylinder that swings the bucket. These hydraulic actuators are supplied with hydraulic oil from a pump.

For example, Patent Literature 1 discloses a boom cylinder driver for a hydraulic excavator. In the boom cylinder driver, the head-side chamber of the boom cylinder is directly connected to a pump that is driven by an electric motor. Accordingly, at a boom lowering operation, the electric motor functions as a power generator, and the potential energy of the boom is regenerated.

On the other hand, the rod-side chamber of the boom cylinder is connected to a tank and a hydraulic pressure source via a switching valve. The switching valve is switched between a normal position and an offset position. When the switching valve is in the normal position, the switching valve brings the rod-side chamber of the boom cylinder into communication with the tank. When the switching valve is in the offset position, the switching valve brings the rod-side chamber into communication with the hydraulic pressure source. The switching valve is controlled in accordance with the pressure of the head-side chamber of the boom cylinder.

More specifically, when the pressure of the head-side chamber is higher than a predetermined value, the switching valve is in the normal position. Accordingly, hydraulic oil flows from the rod-side chamber of the boom cylinder to the tank, or flows from the tank to the rod-side chamber. On the other hand, when the pressure of the head-side chamber is lower than the predetermined value, the switching valve is switched to the offset position. Accordingly, the hydraulic oil is supplied from the hydraulic pressure source to the rod-side chamber of the boom cylinder. In this manner, the pressure of the rod-side chamber of the boom cylinder can be increased.

Typical examples of when the pressure of the head-side chamber is higher than the predetermined value is when a boom raising operation is performed and when a boom lowering operation is performed. On the other hand, a typical example of when the pressure of the head-side chamber is lower than the predetermined value is when a vehicle body lifting operation is performed. The vehicle body lifting operation is an operation that is performed, even after the bucket is grounded such that the boom cannot be lowered any more by external force, intending to retract the boom cylinder (this operation is referred to as “body jack-up” in Patent Literature 1).

CITATION LIST

Patent Literature

PTL 1: Japanese Laid-Open Patent Application Publication No. 2005-315312

SUMMARY OF INVENTION

Technical Problem

However, the boom cylinder driver of Patent Literature 1 requires a pressure source dedicated for an operation that is performed when the pressure of the head-side chamber is relatively low, such as the vehicle body lifting operation.

In view of the above, an object of the present disclosure is to provide a hydraulic excavator drive system capable of increasing the pressure of the rod-side chamber of the boom cylinder at the vehicle body lifting operation without using a pressure source dedicated for the vehicle body lifting operation.

Solution to Problem

In order to solve the above-described problems, a hydraulic excavator drive system according to the present disclosure includes: a first pump connected to a head-side chamber of a boom cylinder and driven by an electric motor; a second pump that supplies hydraulic oil to one of, or both, an arm cylinder and a bucket cylinder; and a switching valve that is in a first position at a boom raising operation and in a second position at a vehicle body lifting operation, the first position being a position in which the switching valve brings a rod-side chamber of the boom cylinder into communication with a tank, the second position being a position in which the switching valve brings the rod-side chamber into communication with the second pump.

According to the above configuration, at the vehicle body lifting operation, the hydraulic oil delivered from the second pump, which is a pump for the arm cylinder and/or the bucket cylinder, is supplied to the rod-side chamber of the boom cylinder. This makes it possible to increase the pressure of the rod-side chamber of the boom cylinder at the vehicle body lifting operation without using a pressure source dedicated for the vehicle body lifting operation.

Advantageous Effects of Invention

The present disclosure makes it possible to increase the pressure of the rod-side chamber of the boom cylinder at the vehicle body lifting operation without using a pressure source dedicated for the vehicle body lifting operation.

DESCRIPTION OF EMBODIMENTS

Figure 1:
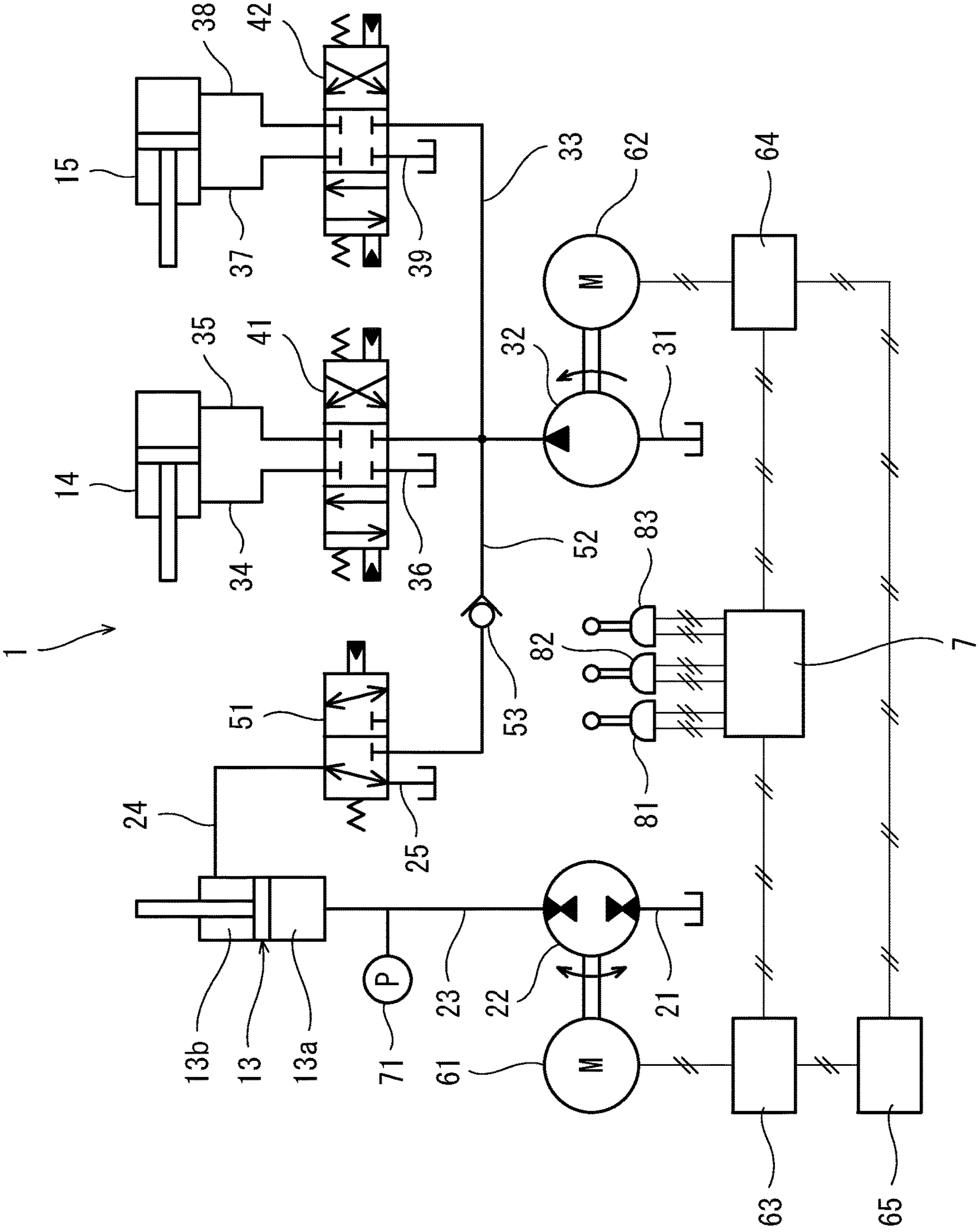
FIG. 1 shows a schematic configuration of a hydraulic excavator drive system according to one embodiment of the present disclosure.
Figure 2:
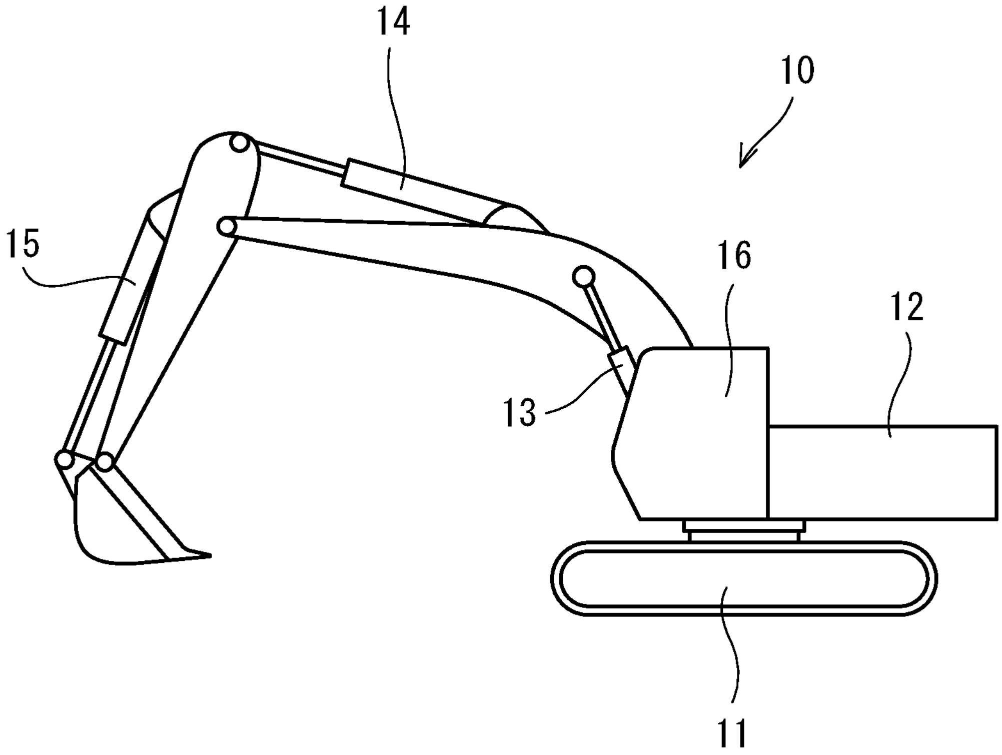
FIG. 2 is a side view of a hydraulic excavator.

FIG. 1 shows a hydraulic excavator drive system 1 according to one embodiment of the present disclosure. FIG. 2 shows a hydraulic excavator 10, in which the drive system 1 is mounted.

The hydraulic excavator 10 shown in FIG. 2 is a self-propelled hydraulic excavator, and includes a traveling structure 11. The hydraulic excavator 10 further includes a stewing structure 12 and a boom. The stewing structure 12 is slewably supported by the traveling structure 11. The boom is luffed relative to the stewing structure 12. An arm is swingably coupled to the distal end of the boom, and a bucket is swingably coupled to the distal end of the arm. The stewing structure 12 includes a cabin 16. The cabin 16 includes a driver's seat. The hydraulic excavator 10 need not be of a self-propelled type.

As shown in FIG. 1, the drive system 1 includes a boom cylinder 13, an arm cylinder 14, and a bucket cylinder 15 as hydraulic actuators. As shown in FIG. 2, the boom cylinder 13 luffs the boom. The arm cylinder 14 swings the arm. The bucket cylinder 15 swings the bucket. An unshown slewing motor and an unshown pair of left and right travel motors may be included either in the drive system 1 or in a different drive system.

The drive system 1 further includes a first pump 22 for the boom cylinder 13 and a second pump 32 for the arm cylinder 14 and the bucket cylinder 15. The first pump 22 supplies hydraulic oil to the boom cylinder 13 at a boom raising operation. The second pump 32 supplies the hydraulic oil to the arm cylinder 14 at an arm operation (an arm crowding operation or an arm pushing operation), and supplies the hydraulic oil to the bucket cylinder 15 at a bucket operation (a bucket excavating operation or a bucket dumping operation).

However, it is not essential for the second pump 32 to supply the hydraulic oil to both the arm cylinder 14 and the bucket cylinder 15. Instead, the second pump 32 may supply the hydraulic oil to either the arm cylinder 14 or the bucket cylinder 15. For example, in a case where the second pump 32 supplies the hydraulic oil only to the arm cylinder 14, the bucket cylinder 15 may be supplied with the hydraulic oil from a third pump.

To be more specific, the second pump 32 supplies the hydraulic oil to the arm cylinder 14 via an arm control valve 41, and supplies the hydraulic oil to the bucket cylinder 15 via a bucket control valve 42. The second pump 32 is connected to the tank by a suction line 31, and to the arm control valve 41 and the bucket control valve 42 by a supply line 33. In other words, the supply line 33 extends from the second pump 32, and branches into multiple lines that connect to the arm control valve 41 and the bucket control valve 42, respectively.

The arm control valve 41 controls the supply and discharge of the hydraulic oil to and from the arm cylinder 14. The arm control valve 41 is connected to the arm cylinder 14 by a pair of supply/discharge lines 34 and 35, to the tank by a tank line 36.

Similarly, the bucket control valve 42 controls the supply and discharge of the hydraulic oil to and from the bucket cylinder 15. The bucket control valve 42 is connected to the bucket cylinder 15 by a pair of supply/discharge lines 37 and 38, and to the tank by a tank line 39.

In the present embodiment, each of the arm control valve 41 and the bucket control valve 42 moves in accordance with a pilot pressure. A pair of pilot ports of the arm control valve 41 is connected to an unshown pair of solenoid proportional valves, respectively. A pair of pilot ports of the bucket control valve 42 is connected to an unshown pair of solenoid proportional valves, respectively. Each of the arm control valve 41 and the bucket control valve 42 is controlled by circuitry 7 via the aforementioned pair of solenoid proportional valves. The circuitry 7 will be described below.

Alternatively, each of the arm control valve 41 and the bucket control valve 42 may move in accordance with an electrical signal. In this case, each of the arm control valve 41 and the bucket control valve 42 is directly controlled by the circuitry 7.

The first pump 22 for the boom cylinder 13 is connected to the tank by a suction/delivery line 21, and is directly connected to a head-side chamber 13*a* of the boom cylinder 13 by a head-side line 23. A rod-side chamber 13*b* of the boom cylinder 13 is connected to a switching valve 51 by a rod-side line 24. The switching valve 51 is connected to the tank by a tank line 25, and to the aforementioned supply line 33 by a relay line 52.

In the present embodiment, at a boom raising operation and at a boom lowering operation, the switching valve 51 is in a first position in which the switching valve 51 brings the rod-side chamber 13*b* of the boom cylinder 13 into communication with the tank (left-side position in FIG. 1; in the present embodiment, neutral position). At a vehicle body lifting operation, the switching valve 51 is in a second position in which the switching valve 51 brings the rod-side chamber 13*b* into communication with the second pump 32 (right-side position in FIG. 1). In the description herein, an operation of lowering the boom when the bucket is in the air is referred to as "boom lowering operation" and an operation of lifting the body (i.e., the traveling structure 11 and the slewing structure 12) of the hydraulic excavator by pushing the bucket against, for example, the ground is referred to as "vehicle body lifting operation".

In the present embodiment, the switching valve 51 is a single valve. However, the switching valve 51 need not be a single valve, but may be configured as multiple valves. For example, although not illustrated, in a case where the rod-side chamber 13*b* of the boom cylinder 13 is connected to the tank by a rod-side line and the rod-side line is connected to the supply line 33 by a relay line, the switching valve 51 may be configured such that the above-described connection relationship of passages can be switched by an open/close valve located on the rod-side line and an open/close valve located on the relay line.

When the switching valve 51 is in the first position, the switching valve 51 blocks the relay line 52, and brings the rod-side line 24 into communication with the tank line 25. When the switching valve 51 is in the second position, the switching valve 51 blocks the tank line 25, and brings the rod-side line 24 into communication with the relay line 52.

The switching valve 51 is configured such that when the switching valve 51 is in the second position, an opening area of the switching valve 51 between the second pump 32 and the rod-side chamber 13*b* is changeable. In the present embodiment, the switching valve 51 moves in accordance with a pilot pressure. The switching valve 51 includes a pilot port connected to an unshown solenoid proportional valve. The switching valve 51 is configured such that when the switching valve 51 is in the second position, the opening area of the switching valve 51 between the second pump 32 and the rod-side chamber 13*b* increases in accordance with increase in the pilot pressure. The switching valve 51 is controlled by the circuitry 7 via the aforementioned solenoid proportional valve.

As described above, the switching valve 51 is in the second position at a vehicle body lifting operation. Except at the vehicle body lifting operation, the switching valve 51 is in the first position. Accordingly, the hydraulic oil flows to the relay line 52 only at the vehicle body lifting operation.

A check valve 53 is located on the relay line 52. At the vehicle body lifting operation, the check valve 53 allows a flow from the second pump 32 toward the rod-side chamber 13*b*, but prevents the reverse flow. The check valve 53 may be included (incorporated) in the switching valve 51.

The first pump 22 is driven by a first electric motor 61, and the second pump 32 is driven by a second electric motor 62. The first electric motor 61 and the second electric motor 62 are connected to a battery 65 via inverters 63 and 64, respectively. Specifically, when the first electric motor 61 drives the first pump 22, the battery 65 supplies electric power to the first electric motor 61, and when the second electric motor 62 drives the second pump 32, the battery 65 supplies electric power to the second electric motor 62. A capacitor may be used instead of the battery 65. The first electric motor 61 and the second electric motor 62 are controlled by the circuitry 7 via the inverters 63 and 64, respectively.

The cabin 16 includes therein a boom operator 81, an arm operator 82, and a bucket operator 83. The boom operator 81 includes an operating lever that is operated in a boom raising direction and a boom lowering direction. The arm operator 82 includes an operating lever that is operated in an arm crowding direction and an arm pushing direction. The bucket operator 83 includes an operating lever that is operated in a bucket excavating direction and a bucket dumping direction. Each of the boom operator 81, the arm operator 82, and the bucket operator 83 outputs an operation signal corresponding to an operating direction and an operating amount (an inclination angle) of the operating lever.

Specifically, when the operating lever of the boom operator 81 is operated in the boom raising direction, the boom operator 81 outputs a boom raising operation signal corresponding to the operating amount of the operating lever, and when the operating lever of the boom operator 81 is operated in the boom lowering direction, the boom operator 81 outputs a boom lowering operation signal corresponding to the operating amount of the operating lever. Similarly, when the operating lever of the arm operator 82 is operated in the arm crowding direction or the arm pushing direction, the arm operator 82 outputs an arm operation signal (an arm crowding operation signal or an arm pushing operation signal) corresponding to the operating amount of the operating lever, and when the operating lever of the bucket operator 83 is operated in the bucket excavating direction or the bucket dumping direction, the bucket operator 83 outputs a bucket operation signal (a bucket excavating operation signal or a bucket dumping operation signal) corresponding to the operating amount of the operating lever.

In the present embodiment, each of the boom operator 81, the arm operator 82, and the bucket operator 83 is an electrical joystick that outputs an electrical signal as an operation signal. Alternatively, each of the arm operator 82 and the bucket operator 83 may be a pilot operation valve that outputs a pilot pressure as an operation signal. In this case, the pair of pilot ports of the arm control valve 41 may be connected to the arm operator 82, and the pair of pilot ports of the bucket control valve 42 may be connected to the bucket operator 83.

Operation signals (electrical signals) outputted from the boom operator 81, the arm operator 82, and the bucket operator 83 are inputted to the circuitry 7. For example, the circuitry 7 is realized by a computer that includes memories such as a ROM and RAM, a storage such as a HDD or SSD, and a CPU. The CPU executes a program stored in the ROM or the storage.

When an arm operation signal is outputted from the arm operator 82 (i.e., at an arm operation), the circuitry 7 controls the arm control valve 41 via an unshown solenoid proportional valve, such that the greater the operating amount of the operating lever of the arm operator 82, the greater the opening area of the arm control valve 41. In a case where only the operating lever of the arm operator 82 is operated, the circuitry 7 may adjust the rotation speed of the second electric motor 62 via the inverter 64, such that the greater the operating amount of the operating lever of the arm operator 82, the higher the delivery flow rate of the second pump 32. Alternatively, the rotation speed of the second electric motor 62 may be constant.

Similarly, when a bucket operation signal is outputted from the bucket operator 83 (i.e., at a bucket operation), the circuitry 7 controls the bucket control valve 42 via an unshown solenoid proportional valve, such that the greater the operating amount of the operating lever of the bucket operator 83, the greater the opening area of the bucket control valve 42. In a case where only the operating lever of the bucket operator 83 is operated, the circuitry 7 may adjust the rotation speed of the second electric motor 62 via the inverter 64, such that the greater the operating amount of the operating lever of the bucket operator 83, the higher the delivery flow rate of the second pump 32. Alternatively, the rotation speed of the second electric motor 62 may be constant.

When a boom raising operation signal is outputted from the boom operator 81 (i.e., at a boom raising operation), the circuitry 7 adjusts the rotation speed of the first electric motor 61 via the inverter 63, such that the greater the operating amount of the operating lever of the boom operator 81, the higher the delivery flow rate of the first pump 22.

As described above, except at a vehicle body lifting operation, the switching valve 51 is in the first position. Accordingly, at the boom raising operation, the hydraulic oil discharged from the rod-side chamber 13*b* of the boom cylinder 13 flows into the tank through the rod-side line 24, the switching valve 51, and the tank line 25.

When a boom lowering operation signal is outputted from the boom operator 81, the circuitry 7 determines which one of a boom lowering operation or a vehicle body lifting operation has been performed. In the present embodiment, the circuitry 7 is electrically connected to a pressure sensor 71, which detects the pressure Ph of the head-side chamber 13*a* of the boom cylinder 13. In the illustrated example, the pressure sensor 71 is located on the head-side line 23. Alternatively, the pressure sensor 71 may be located on the head-side chamber 13*a* of the boom cylinder 13.

In a case where the boom lowering operation signal is outputted from the boom operator 81 and the pressure Ph detected by the pressure sensor 71 is higher than a predetermined value (e.g., the predetermined value is set within the range of 0.5 to 10 MPa), the circuitry 7 determines that a boom lowering operation has been performed. On the other hand, in a case where the boom lowering operation signal is outputted from the boom operator 81 and the pressure Ph detected by the pressure sensor 71 is lower than the predetermined value, the circuitry 7 determines that a vehicle body lifting operation has been performed. That is, when the pressure Ph detected by the pressure sensor 71 falls below the predetermined value during the operating lever of the boom operator 81 being operated in the boom lowering direction, the circuitry 7 determines that a vehicle body lifting operation has started. When it is determined that the vehicle body lifting operation has started, the circuitry 7 switches the switching valve 51 from the first position to the second position via the unshown solenoid proportional valve.

A method of determining, when the boom lowering operation signal is outputted from the boom operator 81, which one of a boom lowering operation or a vehicle body lifting operation has been performed is not limited to the above-described one. For example, in a case where the boom lowering operation signal is outputted from the boom operator 81 and a regenerative current generated by the first electric motor 61 is greater than a predetermined value, the circuitry 7 may determine that a boom lowering operation has been performed, whereas in a case where the boom lowering operation signal is outputted from the boom operator 81 and the regenerative current generated by the first electric motor 61 is less than the predetermined value, the circuitry 7 may determine that a vehicle body lifting operation has been performed. That is, when the regenerative current generated by the first electric motor 61 falls below the predetermined value during the operating lever of the boom operator 81 being operated in the boom lowering direction, the circuitry 7 may determine that a vehicle body lifting operation has started.

Alternatively, in a case where the boom lowering operation signal is outputted from the boom operator 81 and the pressure Pr of the rod-side chamber 13*b* of the boom cylinder 13 is lower than a predetermined value, the circuitry 7 may determine that a boom lowering operation has been performed, whereas in a case where the boom lowering operation signal is outputted from the boom operator 81 and the pressure Pr of the rod-side chamber 13*b* is higher than the predetermined value, the circuitry 7 may determine that a vehicle body lifting operation has been performed.

At a boom lowering operation, the first pump 22 is driven as a motor by the hydraulic oil discharged from the head-side chamber 13*a* of the boom cylinder 13. Accordingly, the first electric motor 61 functions as a power generator, and the potential energy of the boom is regenerated. The generated electric power is stored in the battery 65. At the boom lowering operation, the circuitry 7 reduces the regenerative torque (braking force) of the first electric motor 61 in accordance with increase in the operating amount of the operating lever of the boom operator 81.

As described above, except at a vehicle body lifting operation, the switching valve 51 is in the first position. Accordingly, at the boom lowering operation, the hydraulic oil flows from the tank into the rod-side chamber 13*b* of the boom cylinder 13 through the tank line 25, the switching valve 51, and the rod-side line 24.

At the vehicle body lifting operation, the circuitry 7 switches the switching valve 51 to the second position. Consequently, the hydraulic oil delivered from the second pump 32 is supplied to the rod-side chamber 13*b* of the boom cylinder 13 via the supply line 33, the relay line 52, the switching valve 51, and the rod-side line 24. At the time, the circuitry 7 adjusts the delivery flow rate of the second pump 32 in accordance with the operating amount of the operating lever of the boom operator 81. For example, at the vehicle body lifting operation, if neither the arm operator 82 nor the bucket operator 83 is operated, the circuitry 7 adjusts the rotation speed of the second electric motor 62 via the inverter 64, such that the greater the operating amount of the operating lever of the boom operator 81, the higher the delivery flow rate of the second pump 32.

Also, at the vehicle body lifting operation, if neither the arm operator 82 nor the bucket operator 83 is operated, the circuitry 7 controls the switching valve 51 via the unshown solenoid proportional valve to maximize the opening area of the switching valve 51 between the second pump 32 and the rod-side chamber 13*b*, whereas if either one of the arm operator 82 or the bucket operator 83 is operated, the circuitry 7 controls the switching valve 51 via the unshown solenoid proportional valve such that the switching valve 51 functions as a restrictor.

As described above, in the hydraulic excavator drive system 1 of the present embodiment, at the vehicle body lifting operation, the hydraulic oil delivered from the second pump 32, which is a pump for the arm cylinder 14 and the bucket cylinder 15, is supplied to the rod-side chamber 13*b* of the boom cylinder 13. This makes it possible to increase the pressure of the rod-side chamber 13*b* of the boom cylinder 13 at the vehicle body lifting operation without using a pressure source dedicated for the vehicle body lifting operation.

Moreover, in the present embodiment, since the delivery flow rate of the second pump 32 is adjusted at the vehicle body lifting operation, the speed of the boom cylinder 13 can be controlled by the second pump 32.

Furthermore, in the present embodiment, since the check valve 53 is located on the relay line 52, even when the vehicle body lifting operation is performed concurrently with an arm operation or a bucket operation, the boom cylinder 13 can be prevented from extending.

Still further, in the present embodiment, at the vehicle body lifting operation, if neither the arm operator 82 nor the bucket operator 83 is operated, the opening area of the switching valve 51 between the second pump 32 and the rod-side chamber 13*b* is maximized, which makes it possible to suppress, at the switching valve 51, pressure loss in the hydraulic oil supplied from the second pump 32 to the rod-side chamber 13*b*. On the other hand, if either one of the arm operator 82 or the bucket operator 83 is operated, the switching valve 51 functions as a restrictor, and thereby a necessary delivery pressure of the second pump 32 can be secured.

Variations

The present disclosure is not limited to the above-described embodiment. Various modifications can be made without departing from the scope of the present disclosure.

For example, in the above-described embodiment, at a boom lowering operation, the switching valve 51 is in the first position. Alternatively, at a boom lowering operation, the switching valve 51 may be in the second position. At a boom lowering operation, if suction of the hydraulic oil into the rod-side chamber 13*b* is insufficient, it causes cavitation. Therefore, at a boom lowering operation, by switching the switching valve 51 to the second position to supply the hydraulic oil (pressurized oil) delivered from the second pump 32 to the rod-side chamber 13*b*, the cavitation can be prevented.

In a case where the switching valve 51 is in the second position at a boom lowering operation, regarding the opening area of the switching valve 51 between the second pump 32 and the rod-side chamber 13*b*, the same control as that performed at a vehicle body lifting operation is performed at the boom lowering operation. Specifically, at the boom lowering operation, if neither the arm operator 82 nor the bucket operator 83 is operated, the circuitry 7 controls the switching valve 51 via the unshown solenoid proportional valve to maximize the opening area of the switching valve 51 between the second pump 32 and the rod-side chamber 13*b*, whereas if either one of the arm operator 82 or the bucket operator 83 is operated, the circuitry 7 controls the switching valve 51 via the unshown solenoid proportional valve such that the switching valve 51 functions as a restrictor.

Thus, similar to at the time of performing a vehicle body lifting operation as in the above-described embodiment, also at the time of performing a boom lowering operation, if neither the arm operator 82 nor the bucket operator 83 is operated, pressure loss at the switching valve 51 can be suppressed, whereas if either one of the arm operator 82 or the bucket operator 83 is operated, a necessary delivery pressure of the second pump 32 can be secured. In a case where the switching valve 51 is in the second position at a boom lowering operation, the check valve 53 functions also at the boom lowering operation.

Further, in the above-described embodiment, the switching valve 51 is controlled by the circuitry 7 via the unshown solenoid proportional valve. However, the switching valve 51 need not be controlled by the circuitry 7. For example, an open/close valve that moves in accordance with the pressure of the head-side line 23 may be additionally installed, and the open/close valve may be connected to the pilot port of the switching valve 51. In this case, if the pressure of the head-side line 23 is lower than a setting value, the open/close valve may be opened to switch the switching valve 51 from the first position to the second position.

Alternatively, the switching valve 51 may move not in accordance with a pilot pressure, but in accordance with an electrical signal.

Each of the first pump 22 and the second pump 32 need not be a fixed displacement pump, but may be a variable displacement pump. In a case where the second pump 32 is a variable displacement pump, the second pump 32 may be driven by an engine (an internal combustion engine).

In a case where the second pump 32 is a variable displacement pump, the circuitry 7 may adjust the delivery flow rate of the second pump 32 in accordance with the operating amount of the operating lever of the boom operator 81 by changing the tilting angle of the second pump 32.

Summary

A hydraulic excavator drive system according to the present disclosure includes: a first pump connected to a head-side chamber of a boom cylinder and driven by an electric motor; a second pump that supplies hydraulic oil to one of, or both, an arm cylinder and a bucket cylinder; and a switching valve that is in a first position at a boom raising operation and in a second position at a vehicle body lifting operation, the first position being a position in which the switching valve brings a rod-side chamber of the boom cylinder into communication with a tank, the second position being a position in which the switching valve brings the rod-side chamber into communication with the second pump.

According to the above configuration, at the vehicle body lifting operation, the hydraulic oil delivered from the second pump, which is a pump for the arm cylinder and/or the bucket cylinder, is supplied to the rod-side chamber of the boom cylinder. This makes it possible to increase the pressure of the rod-side chamber of the boom cylinder at the vehicle body lifting operation without using a pressure source dedicated for the vehicle body lifting operation.

For example, the switching valve may be in the first position at a boom lowering operation. In this case, the hydraulic excavator drive system may include: a boom operator including an operating lever that is operated in a boom raising direction and a boom lowering direction; and circuitry that controls the electric motor and the switching valve. When a regenerative current generated by the electric motor falls below a predetermined value during the operating lever of the boom operator being operated in the boom lowering direction, the circuitry may determine that the vehicle body lifting operation has started, and switch the switching valve from the first position to the second position.

In a case where the switching valve is in the first position at the boom lowering operation, the above hydraulic excavator drive system may include: a boom operator including an operating lever that is operated in a boom raising direction and a boom lowering direction; a pressure sensor that detects a pressure of the head-side chamber of the boom cylinder; and circuitry that controls the electric motor and the switching valve. When the pressure detected by the pressure sensor falls below a predetermined value during the operating lever of the boom operator being operated in the boom lowering direction, the circuitry may determine that the vehicle body lifting operation has started, and switch the switching valve from the first position to the second position.

Alternatively, the switching valve may be in the second position at a boom lowering operation.

The above hydraulic excavator drive system may include: a boom operator; an arm operator; a bucket operator; and circuitry that controls the electric motor and the switching valve. The switching valve may be configured such that when the switching valve is in the second position, an opening area of the switching valve between the second pump and the rod-side chamber is changeable. When the switching valve is in the second position, if neither the arm operator nor the bucket operator is operated, the circuitry may control the switching valve to maximize the opening area of the switching valve, and if either one of the arm operator or the bucket operator is operated, the circuitry may control the switching valve such that the switching valve functions as a restrictor. According to this configuration, in a case where the switching valve is in the second position, if neither the arm operator nor the bucket operator is operated, the opening area of the switching valve is maximized, which makes it possible to suppress, at the switching valve, pressure loss in the hydraulic oil supplied from the second pump to the rod-side chamber. On the other hand, if either one of the arm operator or the bucket operator is operated, the switching valve functions as a restrictor, and thereby a necessary delivery pressure of the second pump can be secured.

The above hydraulic excavator drive system may include: a boom operator including an operating lever that is operated in a boom raising direction and a boom lowering direction; and circuitry that controls the electric motor and adjusts a delivery flow rate of the second pump. The circuitry, at the vehicle body lifting operation, may adjust the delivery flow rate of the second pump in accordance with an operating amount of the operating lever of the boom operator. According to this configuration, the speed of the boom cylinder can be controlled by the second pump.

The switching valve may be connected to the rod-side chamber of the boom cylinder by a rod-side line, connected to the tank by a tank line, and connected to a supply line extending from the second pump by a relay line. A check valve that, at least, at the vehicle body lifting operation, allows a flow from the second pump toward the rod-side chamber but prevents a reverse flow may be located at the switching valve or the relay line. According to this configuration, even when the vehicle body lifting operation is performed concurrently with an arm operation or a bucket operation, the boom cylinder can be prevented from extending.

The invention claimed is:

1. A hydraulic excavator drive system comprising:

a first pump connected to a head-side chamber of a boom cylinder and driven by an electric motor;

a second pump that supplies hydraulic oil to one of, or both, an arm cylinder and a bucket cylinder;

a switching valve that is in a first position at a boom raising operation and at a boom lowering operation and in a second position at a vehicle body lifting operation, the first position being a position in which the switching valve brings a rod-side chamber of the boom cylinder into communication with a tank, the second position being a position in which the switching valve brings the rod-side chamber into communication with the second pump;

a boom operator including an operating lever that is operated in a boom raising direction and a boom lowering direction; and circuitry that controls the electric motor and the switching valve, wherein when a regenerative current generated by the electric motor falls below a predetermined value, while the operating lever of the boom operator is being operated in the boom lowering direction, the circuitry determines that the vehicle body lifting operation has started, and switches the switching valve from the first position to the second position.

2. The hydraulic excavator drive system according to claim 1, wherein the circuitry, at the vehicle body lifting operation, adjusts the delivery flow rate of the second pump in accordance with an operating amount of the operating lever of the boom operator.

3. The hydraulic excavator drive system according to claim 1, wherein the switching valve is connected to the rod-side chamber of the boom cylinder by a rod-side line, connected to the tank by a tank line, and connected to a supply line extending from the second pump by a relay line, and a check valve that, at least, at the vehicle body lifting operation, allows a flow from the second pump toward the rod-side chamber but prevents a reverse flow is located at the switching valve or the relay line.

4. A hydraulic excavator drive system comprising:

a first pump connected to a head-side chamber of a boom cylinder and driven by an electric motor;

a second pump that supplies hydraulic oil to one of, or both, an arm cylinder and a bucket cylinder;

a switching valve that is in a first position at a boom raising operation and at a boom lowering operation and in a second position at a vehicle body lifting operation, the first position being a position in which the switching valve brings a rod-side chamber of the boom cylinder into communication with a tank, the second position being a position in which the switching valve brings the rod-side chamber into communication with the second pump;

a boom operator including an operating lever that is operated in a boom raising direction and a boom lowering direction;

a pressure sensor that detects a pressure of the head-side chamber of the boom cylinder; and circuitry that controls the electric motor and the switching valve, wherein when the pressure detected by the pressure sensor falls below a predetermined value while the operating lever of the boom operator is operated in the boom lowering direction, the circuitry determines that the vehicle body lifting operation has started, and switches the switching valve from the first position to the second position.

5. A hydraulic excavator drive system comprising:

a first pump connected to a head-side chamber of a boom cylinder and driven by an electric motor;

a second pump that supplies hydraulic oil to one of, or both, an arm cylinder and a bucket cylinder;

a switching valve that is in a first position at a boom raising operation and in a second position at a vehicle body lifting operation, the first position being a position in which the switching valve brings a rod-side chamber of the boom cylinder into communication with a tank, the second position being a position in which the switching valve brings the rod-side chamber into communication with the second pump;

a boom operator;

an arm operator;

a bucket operator; and circuitry that controls the electric motor and the switching valve, wherein the switching valve is configured such that when the switching valve is in the second position, an opening area of the switching valve between the second pump and the rod-side chamber is changeable, and when the switching valve is in the second position, if neither the arm operator nor the bucket operator is operated, the circuitry controls the switching valve to maximize the opening area of the switching valve, and if the arm operator or the bucket operator is operated, the circuitry controls the switching valve such that the switching valve functions as a restrictor.

* * * * *